(12) United States Patent
Rutkowski et al.

(10) Patent No.: US 7,820,119 B2
(45) Date of Patent: Oct. 26, 2010

(54) SYSTEM AND METHOD OF MAKING FERRIC CHLORIDE WITH REDUCED AMOUNTS OF HYDROCHLORIC ACID FOR WATER TREATMENT

(75) Inventors: Dennis E. Rutkowski, Woodhaven, MI (US); Andy M. Yaksic, Brighton, MI (US)

(73) Assignee: PVS Technologies, Inc., Detroit, MI (US)

( * ) Notice: Subject to any disclaimer, the term of this patent is extended or adjusted under 35 U.S.C. 154(b) by 817 days.

(21) Appl. No.: 11/074,034

(22) Filed: Mar. 7, 2005

(65) Prior Publication Data

US 2005/0147547 A1    Jul. 7, 2005

Related U.S. Application Data

(62) Division of application No. 10/460,849, filed on Jun. 13, 2003, now Pat. No. 6,923,947.

(51) Int. Cl.
*B01J 19/00* (2006.01)
*B01J 19/18* (2006.01)
*C01G 49/10* (2006.01)

(52) U.S. Cl. .................. 422/224; 422/205; 422/225; 422/228; 423/190; 423/493

(58) Field of Classification Search .......... 422/225, 422/205, 228, 224; 423/190, 493, 193
See application file for complete search history.

(56) References Cited

U.S. PATENT DOCUMENTS

| | | |
|---|---|---|
| 1,331,257 A | 2/1920 | Heap et al. |
| 1,979,280 A | 11/1934 | Mitchell |
| 2,021,791 A | 11/1935 | Ladd |
| 2,045,092 A | 6/1936 | Mitchell |
| 2,665,191 A | 1/1954 | Graham et al. |
| 2,752,223 A | 6/1956 | Reeve |
| 2,762,700 A | 9/1956 | Brooks |

(Continued)

FOREIGN PATENT DOCUMENTS

BE    1011575 A3 * 11/1999

(Continued)

OTHER PUBLICATIONS

An english translation of the Abstract is attached to the JP01014116 A.*

(Continued)

*Primary Examiner*—Walter D Griffin
*Assistant Examiner*—Natasha Young
(74) *Attorney, Agent, or Firm*—Brinks Hofer Gilson & Lione

(57) ABSTRACT

The present invention involves a system and method of making ferric chloride with reduced amounts of hydrochloric acid for water treatment. The method comprises preparing a reactant batch comprising ferric oxide and hydrochloric acid at a predetermined molar ratio. The method further includes mixing the reactant batch with an impeller rotating between about 60 and 150 revolutions per minute. The method further includes maintaining the reactant batch at a temperature between about 70° Fahrenheit and 180° Fahrenheit. The method forms a reaction product including ferric chloride and a reduced amount of hydrochloric acid.

21 Claims, 2 Drawing Sheets

U.S. PATENT DOCUMENTS

| | | | |
|---|---|---|---|
| 3,130,014 A * | 4/1964 | Stanton | 422/213 |
| 3,873,678 A | 3/1975 | McCormick et al. | |
| 4,066,748 A | 1/1978 | Lietard et al. | |
| 5,300,268 A | 4/1994 | Van Diest et al. | |
| 5,422,091 A | 6/1995 | Clair et al. | |
| 5,455,017 A | 10/1995 | Clair et al. | |
| 5,976,485 A | 11/1999 | Zolotoochin et al. | |
| 2003/0211031 A1 * | 11/2003 | Temyanko | 423/493 |

FOREIGN PATENT DOCUMENTS

| | | | |
|---|---|---|---|
| CN | 87107648 A * | 8/1988 | |
| DE | 99972 A * | 9/1973 | |
| DE | 110481 A * | 12/1974 | |
| JP | 01014116 A * | 1/1989 | |
| JP | 1079018 | 3/1989 | |
| JP | 6171953 | 6/1994 | |

OTHER PUBLICATIONS

English Abstract of CN 87107648 A, which was published Aug. 10, 1988.*

English Abstract of DD 110481 A, which was published on Dec. 20, 1974.*

English Abstract of DD 99972 A, which was published on Sep. 5, 1973.*

English traslation of Nakajima et al (JP 89-014116 A), which was published on Jan. 18, 1989.*

Machine translation of CN 87107648 A, which was published Aug. 10, 1987.*

English translation of JP 64014116 A, which was published Jan. 18, 1989.*

Machine translation of CN87107648 A, which was published Aug. 1988.*

Machine translation of BE1011575 A3, which was published Nov. 1999.*

PCT Publication WO 94/26667, International Application No. PCT/FR94/00449, Murphy et al., Process for the Preparation of Ferric Chloride, Published on Nov. 24, 1994.

* cited by examiner

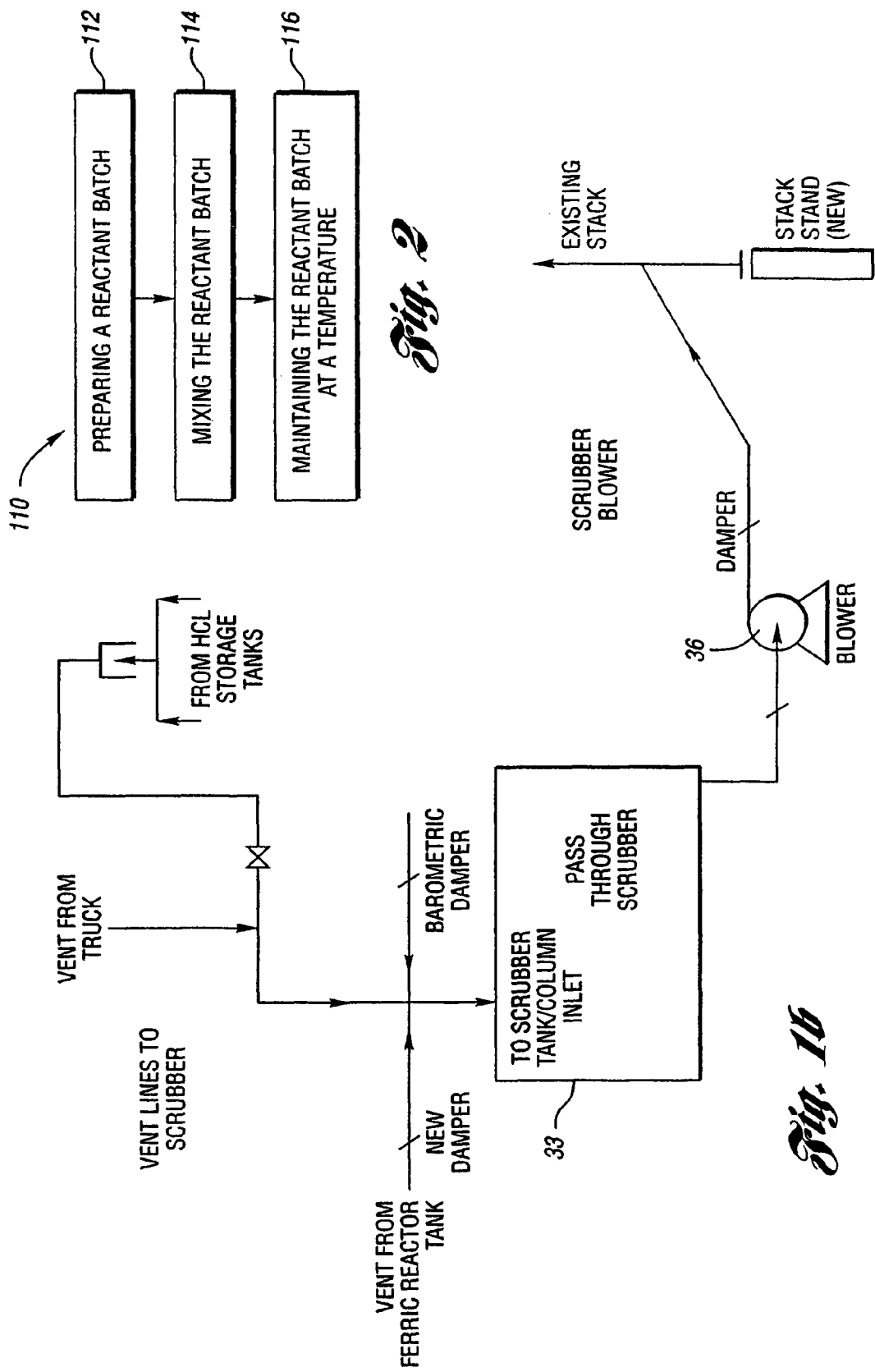

SYSTEM AND METHOD OF MAKING FERRIC CHLORIDE WITH REDUCED AMOUNTS OF HYDROCHLORIC ACID FOR WATER TREATMENT

CROSS-REFERENCE TO RELATED APPLICATIONS

This application claims priority to and is a divisional application of U.S. patent application Ser. No. 10/460,849, filed Jun. 13, 2003 now U.S. Pat. No. 6,923,947, entitled 'METHOD OF MAKING FERRIC CHLORIDE WITH REDUCED AMOUNTS OF HYDROCHLORIC ACID FOR WATER TREATMENT", which is hereby incorporated herein by reference.

BACKGROUND OF THE INVENTION

The present invention relates to systems and methods of making ferric chloride with reduced amounts of hydrochloric acid for water treatment.

Processes of making ferric chloride are known. Ferric chloride has been used in the various industries for many years. For instance, ferric chloride is a component used in water treatment processes. Although current processes of making ferric chloride are adequate, such processes can be improved. For example, many current systems and processes undesirably require chlorine to be reacted with an aqueous solution of ferrous chloride in a recycled aqueous solution of ferric chloride. A number of steps follow which include decompressing and vaporizing a reaction product, recycling the reaction product, and recovering the reaction product. Such process requires numerous process units to make ferric chloride which, in turn, requires costly transportation to a typically remote location.

Many processes of making ferric chloride produce a product having relatively large amounts of hydrochloric acid. Relatively large amounts of hydrochloric acid are undesirable in water treatment processes. Moreover, in many processes of making ferric chloride, numerous steps are required to reduce the amount of hydrochloric acid from the product. Additionally, in such processes, a relatively large number of process units are required to reduce the hydrochloric acid concentration. Furthermore, in turn, the equipment for these processes require a significant measure of space, more than typically available near water treatment plants, thus requiring costly means for transporting ferric chloride to subsequent water treatment plants via rail car or trailers.

Therefore, it is desirable to improve the process of making ferric chloride by reducing the amount of hydrochloric acid concentration from the product to be used in water treatment processes. Moreover, it is further desirable to reduce the number of steps and process units required in making ferric chloride. Furthermore, it is also desirable to reduce the amount of area required to make ferric chloride, thereby eliminating or reducing transportation costs.

BRIEF SUMMARY OF THE INVENTION

In one embodiment, a method of making ferric chloride comprises preparing a reactant batch comprising ferric oxide and hydrochloric acid at a predetermined molar ratio. The method further includes mixing the reactant batch with an impeller rotating between about 60 and 150 revolutions per minute, and maintaining the reactant batch at a temperature between about 70° Fahrenheit and 180° Fahrenheit. The method forms a reaction product including ferric chloride and a reduced amount of hydrochloric acid.

In another embodiment, a system for making ferric chloride comprises a batch reactor for receiving a reactant batch comprising ferric oxide and hydrochloric acid in aqueous solution at a predetermined molar ratio. The batch reactor has baffles disposed on its inner side walls, and a mixer having a rotating shaft and an impeller disposed adjacent the bottom of the reactor. The batch reactor is configured to mix the reactant batch at an agitation speed between about 60 and 150 revolutions per minute and to form a reaction product comprising ferric chloride and a reduced amount of hydrochloric acid. The system further includes a scrubber in fluid communication with the batch reactor to receive hydrochloric acid vapors vented from the batch reactor, and a filter in fluid communication with the batch reactor for filtering the reaction product.

Further objects, features and advantages of the invention will become apparent from consideration of the following description and the appended claims when taken in connection with the accompanying drawings.

BRIEF DESCRIPTION OF THE DRAWINGS

FIG. 1b depicts a process flow diagram of a second portion of the system in FIG. 1a; and FIG. 2 depicts a flow chart of one method of making ferric chloride in accordance with another embodiment of the present invention.

DETAILED DESCRIPTION OF THE INVENTION

Figure 1A:
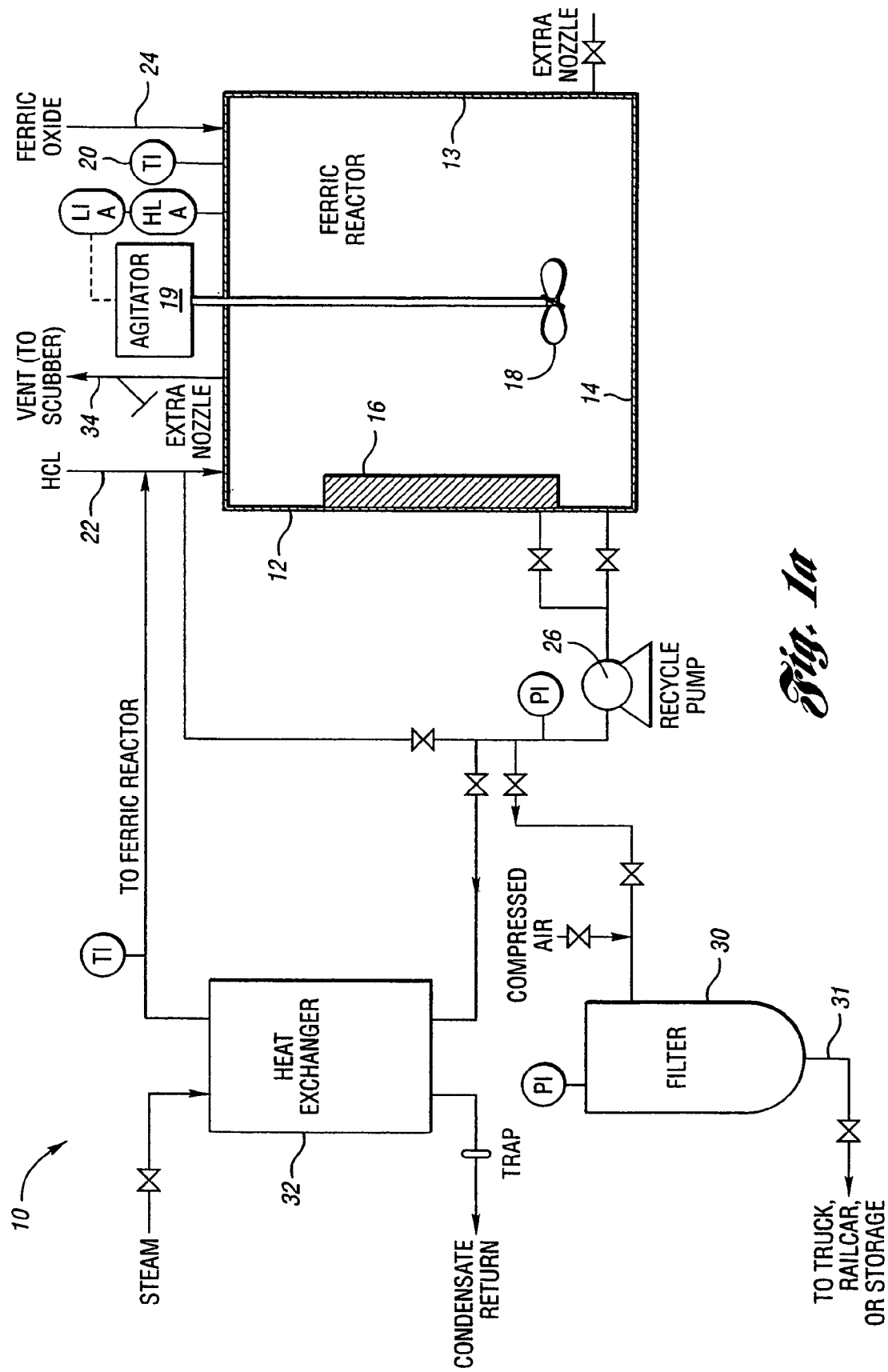
FIG. 1a depicts a process flow diagram of a first portion of one system for making ferric chloride in accordance with one embodiment of the present invention.

FIGS. 1a and 1b illustrate process flow diagrams of a system 10 for making ferric chloride with reduced amounts of hydrochloric acid for water treatment. As shown, the system 10 includes a relatively reduced number of process units to make ferric chloride, allowing the system to be transportable and occupy a relatively small area, thereby reducing transportation costs and transit time of the ferric chloride to water treatment units. System 10 generally includes a batch reactor 12 for receiving a reactant batch of ferric oxide and hydrochloric acid in aqueous solution. As shown in FIG. 1a, system 10 includes a pump 26 for recycling the reactant batch components, heating the reactant batch, and drawing reaction product from the batch reactor 12 to a filter unit 30. System 10 further includes heat exchanger system 32 across which the reactant batch may be pumped for heat transfer to the reactant batch. System 10 may also include a vent 34 to a scrubber system 33 for venting hydrochloric acid vapors from the batch reactor. As shown, the scrubber 33 receives the hydrochloric acid vapors, and exhaust gas is blown to a stack of separation units for further processing of the exhaust gas.

In accordance with one embodiment of the present invention, system 10 includes a batch reactor or "ferric reactor" 12 for receiving a reactant batch of ferric oxide ($Fe_2O_3$) and hydrochloric acid (HCl) at a predetermined molar ratio. Preferably, the molar ratio of ferric oxide to hydrochloric acid in the reactant batch is 3:6. The hydrochloric acid (HCl) and ferric oxide ($Fe_2O_3$) react to form a reaction product including ferric chloride ($FeCl_3$), water ($H_2O$), unreacted hydrochloric acid, and residuals. A quantitative relationship of ferric oxide and hydrochloric acid to make ferric chloride may be represented in a chemical reaction as follows:

$$1Fe_2O_3 + 6HCl \rightarrow 2FeCl_3 + 3H_2O$$

In this embodiment, batch reactor 12 has inner side walls 13 and a bottom 14 integral with inner side walls 13. The inner side walls 13 and bottom 14 may have a protective lining (discussed below) to receive the reactant batch. In this embodiment, the batch reactor 12 is configured to receive and mix a reactant batch comprised of ferric oxide and hydrochloric acid in aqueous solution. The batch reactor 12 is configured to mix the reactant batch at an agitation speed between about 60 and 150 revolutions per minute (rpm) and to form a reaction product including ferric chloride, water, hydrochloric acid, unreacted ferric oxide, and residuals.

In particular, the batch reactor 12 is configured to form a reaction product of ferric chloride having reduced amounts of hydrochloric acid, e.g., between about 0.1 and 3 weight percent hydrochloric acid of the reaction product. As described in greater detail below, the batch reactor is configured to mix the reaction batch for about at least 1 hour. Batch reactor 12 further includes a plurality of baffles 16 disposed about inner side walls 13 to enhance mixing.

In this embodiment, the batch reactor 12 is designed to receive and hold a reactant batch comprising ferric oxide and hydrochloric acid in aqueous solution. For example, the batch reactor may be a reactor manufactured by Belding™ Tank Technologies, model CFV-10 being a 5915 filament wound reinforced fiberglass lined tank having a dome top and a flat bottom. The capacity of the batch reactor is preferably at least about 4,000 gallons. In this embodiment, the capacity of the batch reactor is about 5,900 gallons. The batch reactor has dimensions of 120 inches diameter×120 inches straight side× 140 inches overall height.

The fiberglass liner of the batch reactor may be comprised of polymeric resins including premium grade Derakane 441™ vinyl ester resins throughout and may include an internal veil of double glass with 200 mil corrosion barrier. The batch reactor may have an external coat of premium grade protective coating with an ultraviolet inhibitor. In this embodiment, the batch reactor is designed for 1.9 specific gravity product and for having a −8" water column vacuum. The batch reactor may have reinforcement ribs on the flat bottom. The reactor may preferably include four anti-swirl baffles, of a type such as known in the art, substantially evenly spaced out between each other on the inner side walls.

In this embodiment, batch reactor 12 further includes a mixer 15 having a rotating shaft 17 and an impeller 18 connected to the shaft 17. Blades of the impeller may be located adjacent the bottom 14 of the reactor 12. Impeller 18 enables mixing of reactants within the batch reactor 12 by way of a drive motor 19 connected to the rotating shaft 17. Motor 19 is configured to rotatably drive the shaft 17 thereby rotating the impeller 18 within the batch reactor 12. In this embodiment, the motor 19 has variable speeds at which the impeller may be rotated. Batch reactor 12 also includes a temperature indicator 20 such as known in the art for measuring temperature of a reaction batch during normal operation.

In this embodiment, the mixer is a GA Braun™ mixer model 4BTO5-70 mixer assembly driven by a five horse power motor having a three phase, 60 cycle, 1750 rpm, 230/460 volt motor geared for 70 rpm output. The impeller is a GA Braun™ A35 single-blade impeller unit with a stabilizer mounted on a 2½ inch diameter×122 inch long shaft. The mixer is mounted on an eight inch, 150 pound ANSI flange with a low pressure stuffing box (15 psig). Wetted parts, e.g., blades of the impeller, are 304 stainless steel, rubber lined with high temperature core butyl.

As shown, the system 10 further includes a hydrochloric acid input line 22 from a hydrochloric acid source. The hydrochloric acid source may be any suitable source, such as a holding tank for hydrochloric acid in aqueous solution. The system 10 further includes a ferric oxide input line 24 from a ferric oxide source which may be any suitable source including a storage facility for ferric oxide in solid phase.

At ambient temperatures of about 65° Fahrenheit or greater, it has been determined that a minimum volume or mass of the reactant batch may be used so that the resulting exothermic reaction produces sufficient heat to maintain the reactant batch at a desired temperature range during mixing. In this embodiment, the desired temperature of the reactant batch is between about 70° and 180° Fahrenheit. Thus, at those temperatures and with mixing of between about 60 and 150 rpm, it has been surprisingly found that no heat source or heat exchange system is required to form the reaction product.

However, it also has been found that when using reactant batch volumes below the minimum volume, the heat generated by the resulting exothermic reaction is insufficient to maintain the reactant batch at the desired temperature range during mixing. In this embodiment, it is preferred that at least 4,000 gallons of reactant batch is used to maintain the reactant batch at the desired temperature range.

Preferably, hydrochloric acid in aqueous solution is introduced to the batch reactor. Then, ferric oxide in solid form is added to the hydrochloric acid in aqueous solution, defining the reactant batch. In this embodiment, the hydrochloric acid is supplied from a supply tank (not shown) containing between about 32 and 37 weight percent hydrochloric acid and between about 68 and 63 weight percent water. As mentioned, the ferric oxide supply is preferably in solid (powder) form as it is introduced in the batch reactor after the hydrochloric acid is received in the batch reactor. In this embodiment, the ferric oxide supply includes about 99 weight percent of ferric oxide in powder form.

In this embodiment, the hydrochloric acid concentration in the reactant batch is between about 20 weight percent and 30 weight percent of the reactant batch in aqueous solution, and preferably about 23 weight percent and 27 weight percent of the reactant batch in aqueous solution. The hydrochloric acid concentration is more preferably about 25 weight percent of the reactant batch in aqueous solution.

In this embodiment, it is preferred that the ferric oxide used in the reactant batch be added in solid phase, e.g., powder form. The concentration of the ferric oxide is between about 10 weight percent and 30 weight percent of the reactant batch, and preferably between about 15 weight percent and 25 weight percent of the reactant batch. The ferric oxide concentration in the reactant batch is more preferably about 20 weight percent.

At temperatures less than about 65° Fahrenheit, a heat exchange system is used to provide heat to maintain the reactant batch at the desired temperature range. It is to be understood that a heat exchange system is preferably used when the batch reaction time is less than three hours or when the process is at an ambient temperature of less than 65° Fahrenheit.

As shown, a recycle pump 26 is in fluid communication with the batch reactor 12 to selectively draw product or batch components from the batch reactor. Recycle pump 26 may be used for pumping components of the reactant batch through the heat exchanger 32, drawing product from the batch reactor, or recycling components of the reactant batch within the batch reactor. In this embodiment, the recycle pump is a fiberglass pump 3" (inlet)×1.5" (outlet) with a 15 horse power variable speed drive.

A filter unit 30 may be in fluid communication with the recycle pump for filtering unreacted ferric oxide and residuals, such as dirt and sand, from the reaction product. As shown, the filter unit 30 may have an outlet 31 which allows filtered reaction product to be conveyed to transportation vehicles or storage facilities such as trailers, railcars, or storage tanks. In this embodiment, the reaction product generally includes ferric chloride and the reduced amount of hydrochloric acid. In this embodiment, the filter unit 30 has filters which may be cartridge type filters made of polypropylene retained in a housing made of rubber lined steel.

As shown, system 10 further includes a heat exchanger/boiler system 32 for heating components of the reactant batch or the reaction product to maintain a temperature between about 70° Fahrenheit and 180° Fahrenheit. The heat exchanger system 32 may be configured to heat the reaction product to be recycled within the batch reactor, the reactant batch, or components of the reactant batch.

The heat exchanger/boiler system may include any suitable heat exchanger and boiler known in the art. In this embodiment, the heat exchanger is a shell and tube heat exchanger wherein the shell is made of carbon steel and the tubes are made of tantalum. In this embodiment, the heat exchanger requires a minimum surface area of about 60 ft$^2$. In this embodiment, the heat exchanger is rated for up to about 100 psig steam pressure. The heat exchange system should operate at a minimum of about 3 million Btu per hour wherein the boiler steam is between about 10 psig and 90 psig.

As shown, a scrubber unit 33 may be in fluid communication with batch reactor 12 by way of a vent line 34 to receive hydrochloric acid vapors from the batch reactor. In this embodiment, the vent line 34 may converge with vent lines from other sources such as trucks and storage tanks as shown. As such, a blower 36, located downstream of the scrubber unit 33, may be used to damper the hydrochloric acid to the atmosphere.

The scrubber unit 33 for the hydrochloric acid vent 34 is configured to be able to pull a vacuum of −3 inches of water column and treat 1,000 cubic feet per minute (cfm) of air flow. In this embodiment, the scrubber unit is made of fiberglass and the vent line is made of any suitable material, e.g., fiberglass or chlorinated polyvinyl chloride (CPVC).

The system 10 forms a reaction product including a ferric chloride solution having a reduced amount of hydrochloric acid. In this embodiment, the ferric chloride is between about 20 and 50 weight percent, and preferably 28 and 45 weight percent ferric chloride. The reaction product further includes between about 50 and 80 weight percent water, and preferably 55 and 72 weight percent water. The reaction product further includes between about 0.1 and 3 weight percent hydrochloric acid and preferably about 1 weight percent hydrochloric acid. Preferably, the ferric chloride is about 43 weight percent, the water is about 56 weight percent, and the hydrochloric acid is about 1 weight percent of the reaction product.

FIG. 2 is a flow chart depicting one method 110 of making ferric chloride with reduced amounts of hydrochloric acid. As shown, method 110 comprises a step 112 of preparing a reactant batch comprising ferric oxide and hydrochloric acid at a predetermined molar ratio. Preparing the reactant batch may include introducing hydrochloric acid in aqueous solution and then introducing ferric oxide in solid phase, e.g., ferric oxide powder. The predetermined molar ratio of ferric oxide and hydrochloric acid is at least about 1:6, preferably 3:6. In this embodiment, the ferric oxide is in solid phase (powder) and the hydrochloric acid is in aqueous solution.

The components of the reactant batch may be preheated by way of the heat exchange system discussed above and shown in FIG. 1. This may be accomplished by recycling the component(s) with the recycle pump across the heat exchanger for preheating. In this embodiment, the hydrochloric acid in aqueous solution may be preheated when conditions of the batch reactor have a temperature of equal to or less than 60° Fahrenheit. Optionally, a volume of reactant product may be retained in the batch reactor as the hydrochloric acid and the ferric oxide are introduced into the batch reactor to minimize the concentration of hydrochloric acid in the batch reactor.

The method further includes a step 114 of mixing the reactant batch with a mixer having an impeller rotating between about 60 and 150 revolutions per minute. In this embodiment, the impeller has a pumping capacity of about 19,000 gallons per minute. During mixing, the reactant batch is mixed with the impeller at turbulent flow. The impeller has a power number of about 6.7 at 1.5 specific gravity and a Reynolds number of 8,150 at 200 cps. Preferably, the impeller rotates at about 70 revolutions per minute (rpm). In this embodiment, mixing is performed for about 1 to 3 hours. During mixing, the hydrochloric acid is sampled and tested by titration about every hour in this embodiment. When the weight percent of hydrochloric acid is determined to be about 3 percent or below, mixing may be stopped.

In this embodiment, the method 110 further includes a step 116 of maintaining the reactant batch at a desired temperature between about 70° Fahrenheit and 180° Fahrenheit. Preferably, the reactant batch is maintained at a temperature between about 165° Fahrenheit and 180° Fahrenheit. This may be accomplished with the heat exchange system mentioned above or without the heat exchange system so long as the reactant batch is at a minimum volume, e.g., 4000 gallons, and sufficient mixing is provided, e.g., 60 rpm to 150 rpm.

Thus, the reactant batch may be at a predetermined mass or volume to generate heat from the resulting exothermic reaction to sufficiently maintain the reactant batch at the desired temperature, during mixing, without use of a heat exchange system. In one embodiment, the reactant batch is at a minimum volume of at least 4,000 gallons, and preferably about 5900 gallons, to sufficiently maintain the desired temperature of about 70° Fahrenheit and 180° Fahrenheit during mixing.

At ambient temperatures of less than 65° Fahrenheit, a heat source is used to heat the reactant batch. This may be accomplished by way of the heat exchange system mentioned above. In this embodiment, the recycle pump draws the reactant batch across the heat exchanger for heat transfer to maintain the reactant batch between about 70° and 180° Fahrenheit. As a result, the reaction product is formed including a ferric chloride solution having a reduced amount of hydrochloric acid.

Method 110 may further include venting hydrochloric acid vapors from the batch reactor when mixing the reactant batch at the desired temperature. As discussed above, the hydrochloric acid vapors may be vented to a scrubber unit for hydrochloric acid vapor processing. Method 110 further includes drawing the reaction product from the batch reactor and filtering the reaction product of unreacted ferric oxide and residuals therefrom. As discussed above, this may be accomplished with the recycle pump and the filter unit.

EXAMPLE

About 3077 gallons of 37 weight percent hydrochloric acid in aqueous solution was added in a 5900 gallon batch reactor tank manufactured by Belding™ Tank Technologies, Model CFV-10. The mixer of the tank was activated to rotate at 70 rpm to mix the ferric oxide and hydrochloric acid in aqueous solution. Then, four 2000-pound bags of 99.5 weight percent ferric oxide in powder form were added to the hydrochloric acid in aqueous solution in the batch reactor, defining the reactant batch. The recycle pump was activated to pump the reactant batch across the heat exchange system to heat the reaction batch between about 70 and 180° Fahrenheit. After about 1 hour of mixing and heating, the reactant batch was at a temperature of about 165° Fahrenheit. Mixing and heating continued for a total of 3 hours. After about 3 hours from adding the last bag of ferric oxide to the reactant batch a reaction product was formed.

The reaction product was analyzed and had about 41 weight percent ferric chloride, 58 weight percent water, and 1 weight percent hydrochloric acid of the reaction product.

It should be appreciated that the example, method, and system of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrated and not restrictive, and the scope of the invention is, therefore, indicated by the appended claims rather than by the foregoing description. All changes which come within the meaning and range of equivalency of the claims are to be embraced within their scope.

The invention claimed is:

1. A system for making ferric chloride with low amount of hydrochloric acid for a water treatment process, the system comprising:
    a ferric oxide source and a hydrochloric acid source;
    a reactant batch comprising between about 20 weight percent and 25 weight percent ferric oxide and between about 24 weight percent and 27 weight percent hydrochloric acid of the reactant batch in aqueous solution at a predetermined molar ratio that is stoichiometrically rich in a concentration of ferric oxide relative to a concentration of hydrochloric acid, the ferric oxide and the hydrochloric acid respectively from the ferric oxide source and the hydrochloric acid source and added together to form the reactant batch;
    a batch reactor in fluid communication with the ferric oxide and hydrochloric acid sources, and receiving the reactant batch the batch reactor having inner side walls and a bottom integral with the inner side walls, the batch reactor having baffles disposed on the inner side walls and a mixer having a rotating shaft and an impeller disposed at the bottom of the reactor, the mixer being configured to mix the reactant batch at an agitation speed between about 60 and 150 revolutions per minute and form a reaction product comprising ferric chloride, unreacted ferric oxide and between about 0.1 and 3 weight percent hydrochloric acid;
    a scrubber in fluid communication with the batch reactor to receive hydrochloric acid vapors vented from the batch reactor for hydrochloric acid processing; and
    a filter in fluid communication with the batch reactor for filtering the reaction product.

2. The system of claim 1 further comprising a heat exchanger system in fluid communication with the batch reactor for heat transfer to the reactant batch to heat the reactant batch to a temperature of between about 70° and 180° Fahrenheit.

3. The system of claim 1 wherein the mixer includes a single impeller having a pumping capacity of about 19,000 gallons per minute.

4. The system of claim 1 wherein the batch reactor is configured to mix the reactant batch is at turbulent flow.

5. The system of claim 1 wherein the mixer has a power number of about 6.7 at 1.5 specific gravity and a Reynolds Number of 8,150 at 200 cps.

6. The system of claim 1 wherein the batch reactor is configured to receive the reactant batch at a volume of at least 4,000 gallons to substantially maintain a temperature between about 70° Fahrenheit and 180° Fahrenheit during mixing.

7. The system of claim 1 wherein the batch reactor is configured to receive the reactant batch is at a predetermined volume to produce heat from an exothermic reaction between ferric oxide and hydrochloride acid to maintain the reactant batch temperature between about 70° Fahrenheit and 180° Fahrenheit.

8. The system of claim 1 wherein the batch reactor is configured to maintain the reactant batch at a temperature between about 165° Fahrenheit and 180° Fahrenheit.

9. The system of claim 1 wherein the batch reactor is configured to mix the reactant batch for about one to three hours.

10. The system of claim 1 wherein the hydrochloric acid source feeds the batch reactor with an acid solution comprising between about 32 and 37 weight percent hydrochloric acid and between about 63 and 68 weight percent water, the reactant batch comprising the acid solution and ferric oxide.

11. The system of claim 10 wherein the ferric oxide source feeds the batch reactor with a powder that comprises ferric oxide, the reactant batch comprising the acid solution and the powder.

12. The system of claim 11 wherein the powder comprises about 99 weight percent ferric oxide.

13. A system for making ferric chloride with low amount of hydrochloric acid for a water treatment process, the system comprising:
    a reactant batch comprising between about 20 weight percent and 25 weight percent ferric oxide and between about 24 weight percent and 27 weight percent hydrochloric acid of the reactant batch in aqueous solution at a predetermined molar ratio that is stoichiometrically rich in a concentration of ferric oxide relative to a concentration of hydrochloric acid;
    a batch reactor containing the reactant batch, the batch reactor having inner side walls and a bottom integral with the inner side walls, the batch reactor having baffles disposed on the inner side walls and a mixer having a rotating shaft and an impeller disposed at the bottom of the reactor, the mixer being configured to mix the reactant batch at an agitation speed between about 60 and 150 revolutions per minute and form a reaction product comprising ferric chloride, unreacted ferric oxide and between about 0.1 and 3 weight percent hydrochloric acid;
    a scrubber in fluid communication with the batch reactor to receive hydrochloric acid vapors vented from the batch reactor for hydrochloric acid processing; and
    a filter in fluid communication with the batch reactor for filtering the reaction product.

14. The system of claim 13 further comprising a heat exchanger system in fluid communication with the batch reactor for heat transfer to the reactant batch to heat the reactant batch to a temperature of between about 70° and 180° Fahrenheit.

15. The system of claim 13 wherein the mixer includes a single impeller having a pumping capacity of about 19,000 gallons per minute.

16. The system of claim 13 wherein the batch reactor is configured to mix the reactant batch is at turbulent flow.

17. The system of claim 13 wherein the mixer has a power number of about 6.7 at 1.5 specific gravity and a Reynolds Number of 8,150 at 200 cps.

18. The system of claim 13 wherein the batch reactor is configured to receive the reactant batch at a volume of at least 4,000 gallons to substantially maintain a temperature between about 70° Fahrenheit and 180° Fahrenheit during mixing.

19. The system of claim 13 wherein the batch reactor is configured to receive the reactant batch is at a predetermined volume to produce heat from an exothermic reaction between ferric oxide and hydrochloride acid to maintain the reactant batch temperature between about 70° Fahrenheit and 180° Fahrenheit.

20. The system of claim 13 wherein the batch reactor is configured to maintain the reactant batch at a temperature between about 165° Fahrenheit and 180° Fahrenheit.

21. The system of claim 13 wherein the batch reactor is configured to mix the reactant batch for about one to three hours.

* * * * *